L. DAVIDSON.
DEVICE FOR REMOVING SNOW, STORM WATER, AND SEWAGE.
APPLICATION FILED JUNE 18, 1914.
1,224,448.
Patented May 1, 1917.
2 SHEETS—SHEET 1.
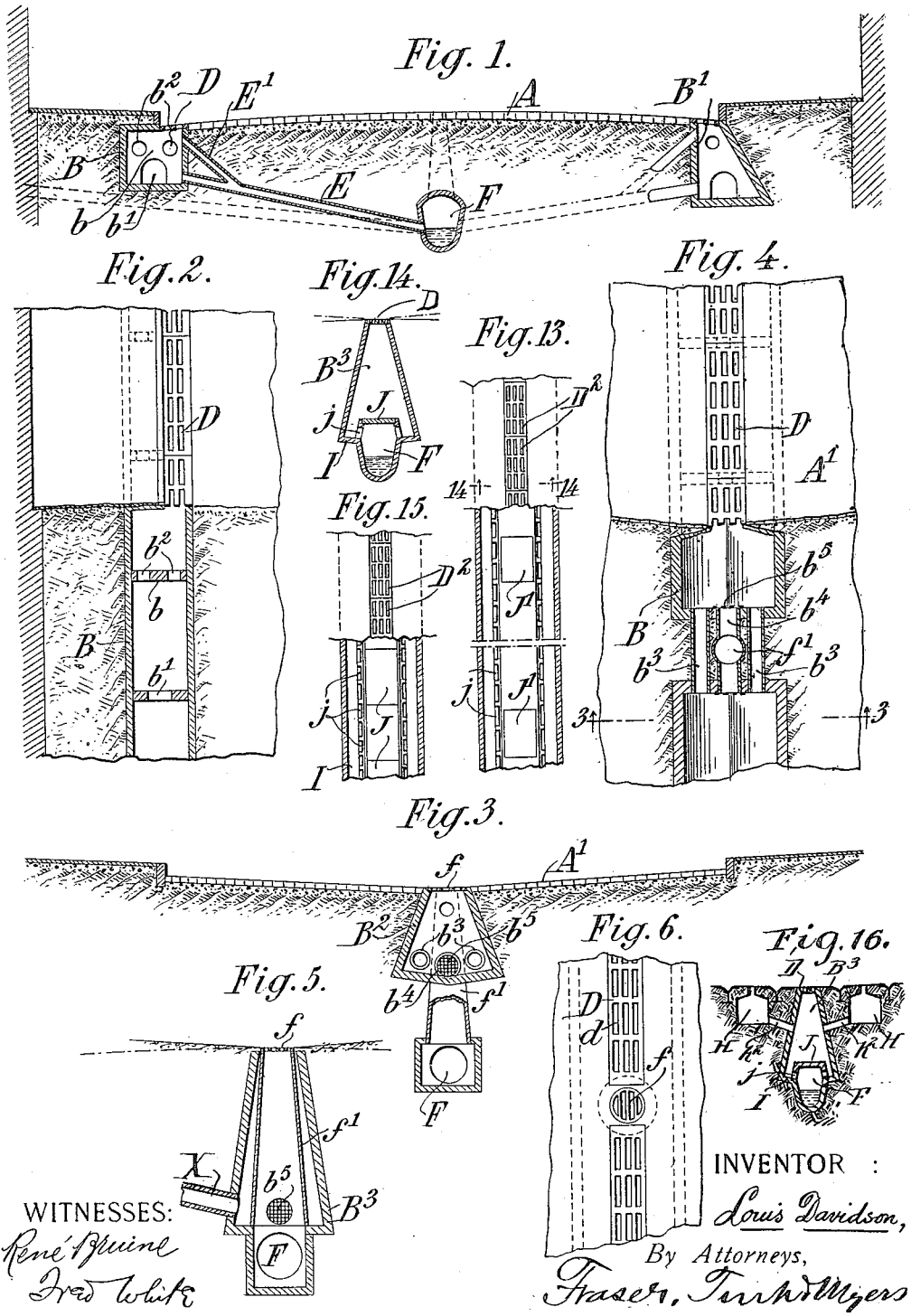
WITNESSES:
René Bruine
Fred White
INVENTOR:
Louis Davidson,
By Attorneys,
Fraser, Turkel Myers

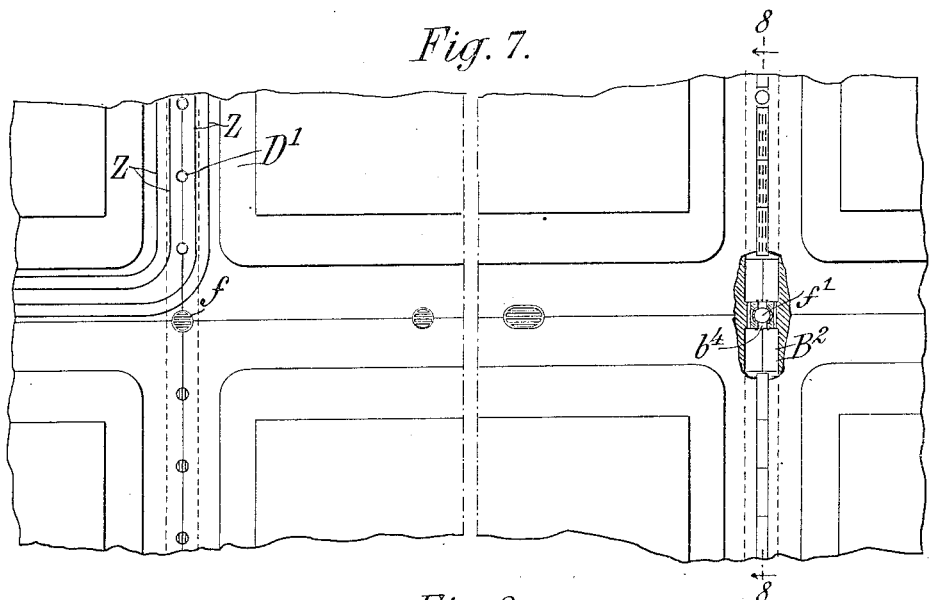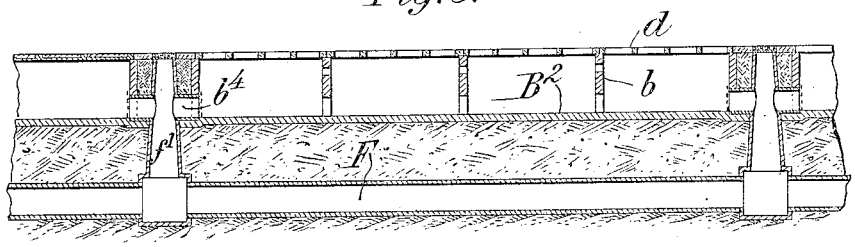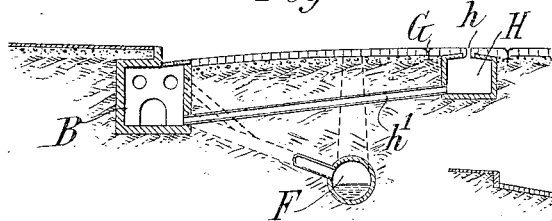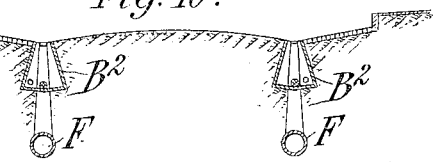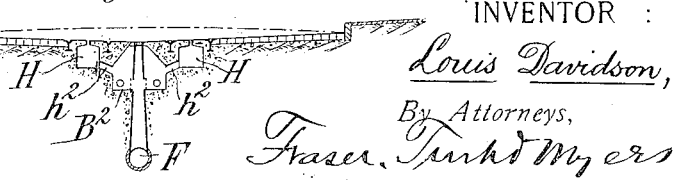

UNITED STATES PATENT OFFICE.

LOUIS DAVIDSON, OF NEW YORK, N. Y.

DEVICE FOR REMOVING SNOW, STORM-WATER, AND SEWAGE.

1,224,448.     Specification of Letters Patent.     Patented May 1, 1917.

Application filed June 18, 1914. Serial No. 845,797.

*To all whom it may concern:*

Be it known that I, LOUIS DAVIDSON, a citizen of the United States of America, residing in the borough of Manhattan, city, county, and State of New York, have invented certain new and useful Improvements in Devices for Removing Snow, Storm-Water, and Sewage, of which the following is a specification.

My invention relates to means for economically and expeditiously removing snow from the public highways, and it will also be found useful in the removing therefrom of storm water, and it may also be used to remove sewage if desired, and in each case of serving as an adjunct or auxiliary to the usual sewer system provided.

My invention consists in the provision of a receptacle for the said snow, and which may also serve as a receptacle for storm water or sewage, and access to which is provided for the insertion of said snow, and which is connected by conduits with the usual sewer for the removal of waste water, etc. Desirable forms in which my invention may be embodied are illustrated in the accompanying drawings, wherein,—

Figure 1 illustrates a cross-section of a street and side walks showing my invention for use at the sides of a street;

Fig. 2 is a detail top view of one of the receptacles partly broken and parts being in section;

Fig. 3 illustrates the application of my invention to a street having its lower part at substantially the center thereof, at which point my improved receptacle is located;

Fig. 4 is a detail plan view partly in section of part of the structure of Fig. 3;

Fig. 5 illustrates the employment of my receptacle in modified form;

Fig. 6 is a plan view of the structure of Fig. 5;

Fig. 7 illustrates the employment of my invention in a street having trolley tracks, and Fig. 8 is a section thereof on the line 8—8 Fig. 7;

Fig. 9 illustrates the use of my invention in a street provided with trolley tracks where the sewer is between the track and the side walk;

Fig. 10 illustrates the use of the invention in a very wide street where the center of the street may be occupied by parks;

Fig. 11 illustrates my invention for use in a street having double trolley tracks;

Fig. 12 is a species of cover which may be employed for my receptacle conforming to the pavement;

Fig. 13 is a plan view partly in section, illustrating the preferred form of my invention;

Fig. 14 is a section thereof on the line 14—14, Fig. 13, and Fig. 15 is a view similar to Fig. 13 illustrating a modified arrangement of sewer covers for my preferred form.

Fig. 16 is a view similar to Fig. 14 of my preferred form illustrating the employment of my invention in connection with the slots of trolley tracks.

In carrying my invention into use in the form shown in Fig. 1 in a street paved with the usual pavement as at A, Fig. 1, I prefer to provide receptacles B B¹ which are preferably situated at the lowest points in the streets, in this case at the curbs. These receptacles may be of any desired form, and for the purpose of increasing their area they may be extended under the side walk as illustrated. The bottoms of the receptacles are preferably located at a point which is below the usual frost line, so that any snow which may be placed therein will be liable to melt, and further that the melted snow will not readily freeze. I provide covers D for my receptacle and these are made removable to permit the placing of snow in the receptacle. The covers may be removable in a continuous line, or such covers as are desired and as are necessary for the insertion of the snow may be removed. I prefer to perforate the covers, and for this purpose the grated form illustrated is well adapted, so that the storm water will readily flow into the receptacle. A conduit E is provided which leads from the lower part of the receptacle B to the sewer F. The lower part of the receptacle B is situated above the bottom of the sewer and the conduit E is inclined from the receptacle toward the sewer so that the water flows from the receptacle to the sewer by gravity. It may occur that the receptacle B is filled with snow, at which time there may be a copious inflow of water from a heavy rainfall or other cause, and to provide for the discharge of the said water to the sewer I prefer to have an auxiliary conduit $E^1$ which is connected to the receptacle at or near the upper part thereof, and which leads therefrom to the sewer. If desired this conduit may connect with the conduit E and employ the same for part of its length.

The receptacle employed in my invention may be provided with partitions $b$ which are situated at intervals as frequent as is desired considering the size of the receptacle. These partitions are perforated as illustrated at $b^1$ $b^2$ and permit of the easy flow of water therethrough.

In Fig. 3, I have illustrated my invention as employed in connection with a reshaped street pavement, and here the pavement $A^1$ is inclined downward from both sides to a substantially median point, so that the surface water will drain from the street to the center. The sewer F is located as usual and has the usual man-holes $f$ which have the usual shaft $f^1$ leading to the sewer. My invention is here employed in the form of a receptacle which is preferably continuous between adjacent man-holes, and is situated in line with the same. It is provided with covers D which are removable so that snow may be swept or shoveled into the receptacle. These covers are perforated at $d$ for the purpose of permitting the easy passage of water to the receptacle. For the purpose of establishing communication between the receptacles at each side of the man-hole, I connect the same by conduits $b^3$ so that a constant flow of water may take place through the receptacle. This water is discharged from the receptacle $B^2$ to the sewer F by an opening which connects the receptacle to the sewer and which leads from the receptacle into a man-hole, or the water can flow through the receptacle $B^2$ and connecting conduits $b^3$ directly to the outlet. The man-hole is connected by a conduit $b^4$ with the receptacle, and this is preferably covered by a grating $b^5$. It will be perceived that in all adaptations of my invention the receptacle acts to assist the sewer in disposing of great accumulations of water. Practically the only time the street sewers become overtaxed and unequal to the load imposed upon them, is in cases of very heavy rainfalls. At this time particularly if there is a snowfall on the ground which is melted by rain, an enormous volume of water has to be taken care of, and frequently the sewers are unable to meet this suddenly increased load, with the result that the cellars are frequently overflowed and much damage is done. The form of my invention illustrated in Fig. 5 is particularly adapted to serve as an auxiliary to the sewer in removing storm water or sewage, and it forms an auxiliary high level sewer. This form of the invention differs from that illustrated in Fig. 3 principally in that the receptacle $B^3$, Fig. 5, has its floor located at a lower point than illustrated in the previous figures, whereby its capacity is increased. This form of my invention contemplates the use of the receptacle also as a snow receptacle, and for this purpose it may be used with a street having either the usual convex crown or having the inverted arch as illustrated in Fig. 3. In either form of the invention I employ the removable grating cover D or the solid cover K. In order to enable my receptacle to assist in carrying off sewage, it may have a connection X to any desired building (Fig. 5).

The modifications illustrated in Figs. 7 and 8 show the various manners in which my invention may be used. In these figures the invention is illustrated in use upon a street having trolley tracks Z—Z. In such case it may be inadvisable to use the invention in the form illustrated in Fig. 1, with continuous covers, for the reason that the same are crossed by the tracks. Accordingly the invention as here illustrated is provided as shown on the left-hand side of Fig. 7 with a number of separated covers $D^1$ which may be employed to provide access to the receptacle $B^2$. The entrance from the receptacle $B^2$ to the sewer may be through passages $b^4$ as in Fig. 4 through the man-hole $f^1$ and to the sewer F. On the right hand side of Fig. 7 is illustrated a construction which may be employed where it is possible to use the continuous covers $d$. The construction in other respects is the same as described with reference to the left-hand side of the figure.

If desired, I may employ more than one receptacle, and this manner of using my invention is illustrated in Fig. 9, wherein trolley tracks G are illustrated as occupying the center of the street, and here I have provided a supplementary receptacle H which is located between the trolley tracks and receives water if desired through the trolley slot $h$. This receptacle H drains through a pipe $h^1$ to the receptacle B, whence the water passes through the usual conduits to the sewer F.

In the case of a very wide street as illustrated in Fig. 10, I may provide a plurality of conduits $B^2$, and these may be constructed and located as illustrated in Fig. 3, draining into the circular sewers F through openings $b^4$, of which two are illustrated, or through the conduits $b^3$ into the outlets. Frequently in the case of a wide street the center is occupied by a park or inclosure, and in such case it may prove advantageous to have the street slope on each side toward the respective receptacles as illustrated, as thereby a more adequate drainage is insured.

Fig. 11 illustrates an employment of my invention in a street provided with two trolley tracks, each of which is provided with a receptacle H located in the center of each pair of tracks, and between these tracks is located a receptacle $B^2$ which is constructed and operates as in Fig. 10; openings $h^2$ connect each receptacle H with the main receptacle $B^2$ and serve to drain water or snow therefrom, and may if desired be of a size to permit a person passing therethrough. This has an advantage in that it enables the removal of snow passing through the trolley slot which is occasionally sufficient in quantity to stop the operation of the road.

Figs. 13, 14 and 15 illustrate a manner of employing my invention which is simple and may be extremely desirable, and which is my preferred form. Here the receptacle $B^3$ is constructed directly over the sewer F, which in this case may be of U-shape as shown and is preferably provided with ledges I which form a platform upon which a workman may stand in examining or cleaning the sewer, and which also forms the floor of the receptacle $B^3$. Removable covers J are provided for the sewer. These may be located at intervals as at $J^1$ in Fig. 13, or continuous as in Fig. 15. They provide convenient means for obtaining access to the sewer to clean same. The sides $j$ are preferably provided with openings by which the water in the receptacle $B^3$ may pass into the sewer. Such openings may well take the form of gratings as illustrated. In the sweeping of snow through the covers $D^2$ and to the snow receptacle, there is a considerable liability of solid material being carried along with the snow, such as stones, bricks, broom heads and other articles which may be deposited by careless householders in the street. These should not be permitted to pass into the sewer where they will be carried off with the flow or may result in an accumulation which will stop the sewer. The gratings $j$, therefore, have the desired function of preventing the passage of any solid matter which may be carried with the snow, of such a size as to be objectionable, to the sewer. In this, as in other forms of my invention, the receptacle $B^3$ is provided with covers $D^2$ which are removable to permit the insertion of snow, and may be imperforate, as shown if at the crown of the street, or may be perforated to permit the passage of storm water if the crown is inverted, as in Fig. 3. Preferably, I will construct the road with an inverted crown and employ the perforated covers as in Fig. 3. The receptacle $B^3$, as in other forms, is continuous and leads to the outlet, and therefore forms an auxiliary high level sewer. The perforations $j$ are desirable and will probably be employed, but the proper performance of the functions of the receptacle $B^3$ is not dependent upon such perforations.

It will be seen from the foregoing that, broadly considered, my invention contemplates the production of improved means for carrying off snow and storm water, consisting of a receptacle, the bottom of which is preferably located below the frost line, which receptacle is provided with covers removable to permit the insertion of snow therein, and preferably perforated, so that the storm water will flow therein. This may be located at the middle of the street, as shown in some figures, or at the curb, as shown in other figures. An essential part of the invention is that the receptacle extends continuously throughout the surface to be drained, and to the main outlet, and by outlet I mean the point where the sewage is discharged. The said receptacle therefore acts as an auxiliary high level sewer.

In the preferred form of my invention, which is indicated in Figs. 13, 14 and 15, the main sewer, there designated F, and the high level or auxiliary sewer, designated $B^3$, which acts as the storm water and snow remover, are indicated as within the same walls, and this is a highly desirable manner of employing the invention. The snow is inserted into the receptacle $B^3$ through the removable covers D, and these covers, as indicated in the drawing, if situated at a low part of the street, may be perforated to permit the free flow therein of storm water or other surface water. Unperforated covers however, will answer if the cover is at a high part of the street. For some reasons it will be desirable that the high level sewer $B^3$ and the ordinary sewer F shall be connected, as by the openings $j$. But my broad invention, as above outlined, is present without such connection, and the structural advantages of the preferred form are not dependent upon such connection.

The manner of covering the receptacle is dependent largely upon the use to which the invention is to be put. If it is to be employed purely as an auxiliary high level sewer to assist the main sewer in disposing of storm water, it should be provided with adequate openings as illustrated in Fig. 2, and this is also true if the receptacle is to be employed for the purpose of removing snow and storm water, although in this case the covers should be removable to permit the insertion of the snow. If the receptacle is only to be employed for the purpose of receiving and retaining the snow until it is melted, the cover need not necessarily be perforated, but may be as in the form illustrated in Fig. 12, where a frame K may be provided and may carry paving material k conforming if desired to the pavement of the street, and held in place by ribs as k¹, although this is a matter which may be changed as desired and forms no important part of my invention.

In Fig. 16 I have illustrated the adaptability of the preferred form of my invention illustrated in Figs. 13, 14 and 15 to be used in connection with the form illustrated in Fig. 11, wherein conduits h² drain the trolley conduits H into the receptacle B³. The construction in other respects is the same as that of Fig. 14, and the receptacle B³ is provided with covers D which are illustrated as perforated.

Furthermore the location of the receptacle may be shifted as desired to suit the particular case in hand. The depth at which the bottom of the receptacle is placed is preferably below the frost line, so that the melting of the snow placed therein is not retarded, but this is not essential. This melting will be assisted by the warm vapors which may rise from the sewer through the conduit E. Furthermore the shape of the receptacle is a matter which may be changed as desired, and this is illustrated by the many shapes which I have shown in the accompanying drawings.

In all forms of my invention the snow receptacle B, B¹, B², B³ extends substantially continuously throughout the territory to be drained to its outlet, and I say substantially because sections of the receptacle may be connected by small pipes which permit of the flow of water from one section to the next. The outlet is the final point of discharge of the water, or other fluid or matter carried off in the receptacle and generally referred to as the flow. The receptacle may be co-terminous with the sewer and in such case this outlet may be at the same point as the sewer outlet although not necessarily so, as the sewer may discharge in a disposal plant and the flow through the snow and storm water receptacle B, B¹, B² or B³ being usually of a different nature, need not be so treated, and may be discharged directly into a river. Therefore the said receptacle may diverge from the sewer before their respective outlets are reached and have a separate outlet. In many of the forms of my invention illustrated, particularly in the adaptation of the preferred form thereof, as illustrated in Fig. 16, the receptacles H may advantageously be used for other purposes, as, for instance, for pipe galleries or for the reception of a trolley power rail.

These and other particulars might be modified and equivalent devices substituted therefor without departing from my invention as claimed in the following claims.

I claim as my invention:—

1. In a device of the character described, a receptacle for snow and water having its bottom above the bottom of a sewer and having an entrance opening into a low part of the street, covers therefor which are removable to permit insertion of snow therein and having openings to permit the passage of water, and a connection from the lower part of said receptacle to the sewer.

2. In a device of the character described, a surface drain having its bottom above the bottom of a sewer, covers therefor which are perforated to permit the passage of water, and a conduit leading from a lower part of said receptacle to the sewer, said drain extending in a substantially continuous line throughout the territory drained and forming an auxiliary high level sewer.

3. In a device of the character described, a receptacle for snow located below the surface of the street, having covers which are removable to permit the insertion of snow therein, said receptacle being located over a sewer and extending in a substantially continuous line to the outlet, and openings being provided between said receptacle and said sewer through which drainage water may pass.

4. In a device of the character described, a receptacle for snow located below the surface of the street, having covers which are removable to permit the insertion of snow therein, said receptacle being located over a sewer and extending in a substantially continuous line between the manholes thereof, the receptacles on the sides of the manholes being connected to permit the flow of water, and openings being provided from the lower part of the receptacle to the manholes.

5. In a device of the character described, a receptacle for snow and storm water located below the surface of the street, having covers which are removable to permit the insertion of snow therein and are perforated to permit the passage of storm water, said receptacles being located over a sewer and extending in a substantially continuous line between the manholes of said sewer, said receptacles on each side of a manhole being connected and openings being provided from a low part of the receptacle to the sewers, whereby said receptacle serves as a receptacle for snow and serves to convey the melted snow to the sewer and as an auxiliary to the sewer in carrying off storm water.

6. In a device of the character described, a receptacle for snow having its bottom below the frost line and above the bottom of a sewer, covers therefor which are removable to permit the insertion of snow therein, and a conduit leading from the lower part of said receptacle to the sewer to carry off water.

7. In a device of the character described, a plurality of receptacles for snow below the surface of the street, covers therefor which are removable to permit the insertion of snow, and connections between said receptacles permitting a flow of liquid from one receptacle to another, said connected receptacles extending substantially throughout the territory drained and providing a continuous drain to the outlet.

8. In a device of the character described, a receptacle below the surface of the street, a partition therein for dividing the receptacle into snow and sewer divisions, covers for said receptacle on the street surface, removable to permit the insertion of snow and openings between the snow receptacle and sewer for draining same.

9. In a device of the character described, a receptacle below the surface of the street, a partition therein for dividing the receptacle into snow and sewer divisions, said partition having portions thereof which are removable to provide access to the sewer, covers for said receptacle on the street surface, removable to permit the insertion of snow and openings between the snow receptacle and sewer for draining same.

10. In a device of the character described, a plurality of receptacles for snow below the surface of the street and above the bottom of a sewer, covers therefor which are removable to permit the passage of snow and are perforated to permit the passage of storm water, connections from one receptacle to the next forming a continuous drain, and connections from said receptacles to the sewer, said connected receptacles adapted to form an auxiliary high level sewer.

11. In a device of the character described, a receptacle below the surface of the street, a partition therein for dividing the receptacle into snow and sewer divisions, each of said divisions extending in a substantially continuous line throughout the territory drained by it to its outlet, said receptacle having openings from the snow division to the street, and removable covers therefor.

12. In a device of the character described, a receptacle below the surface of the street, a partition therein for dividing the receptacle into snow and sewer divisions, each of said divisions running to the point of final discharge of the flow of the respective divisions, said receptacle having openings from the snow division to the street, and removable covers therefor, and said partition having portions which are removable for providing access to the sewer.

13. In a device of the character described, a receptacle below the surface of the street extending in a substantially continuous line throughout the territory drained and a partition therein for dividing the receptacle into snow and sewer divisions, each of said divisions running to the point of final discharge of the flow of the respective divisions, said receptacle having openings from the snow division to the street, and removable covers therefor, said partitions having portions which are removable for providing access to the sewer, and connections between said receptacle and the car slots of a surface car line to drain or clean same.

14. In a device of the character described, a receptacle below the surface of the street extending in a substantially continuous line throughout the territory drained and draining to its outlet, openings from said receptacle to the street, and covers therefor which are removable to permit insertion of snow, and the upper part of the receptacle being closed by the covers.

15. In a device of the character described, a receptacle below the surface of the street, a partition therein for dividing the receptacle into snow and sewer divisions, said partition having portions thereof which are removable to provide access to the sewer, covers for said receptacle on the street surface, removable to permit the insertion of snow.

16. In a device of the character described, a receptacle below the surface of the street, covers for said receptacle on the street surface, removable to permit the insertion of snow, and means for dividing the same into snow and liquid divisions and for preventing solid matter carried with the snow from coming into contact with the flow in the liquid division.

17. In a device of the character described, a receptacle below the surface of the street, means for dividing same into snow and liquid divisions and for preventing solid matter carried with the snow from coming into contact with the flow in the liquid division, covers for said receptacle on the street surface removable to permit the insertion of snow, and drainage openings from the snow division to the liquid division.

18. In a device of the character described, a receptacle below the surface of the street extending substantially continuously throughout the territory drained, a partition therein for dividing the receptacle into snow and sewer divisions, said receptacle having openings from the snow division to the street, and covers therefor which are removable to permit the insertion of snow, said partition having portions which are removable for providing access to the sewer, and a second receptacle extending substantially parallel to said first-named receptacle, and said first and second-named receptacles communicating with one another.

19. In a device of the character described, a receptacle below the surface of the street, a partition therein for dividing the receptacle into snow and sewer divisions, each of said divisions extending in a substantially continuous line throughout the territory drained to its outlet, said receptacle having openings from the snow division to the street and removable covers therefor, and openings being provided between the sewer division and the street, and removable covers for said last-named openings.

In witness whereof, I have hereunto signed my name in the presence of two subscribing witnesses.

LOUIS DAVIDSON.

Witnesses:
HENRY M. TURK,
FRED WHITE.

Copies of this patent may be obtained for five cents each, by addressing the "Commissioner of Patents, Washington, D. C."